United States Patent [19]

Richfield

[11] 4,274,684
[45] Jun. 23, 1981

[54] PERMANENTLY LUBRICATED BEARING

[76] Inventor: Steven E. Richfield, 10032-31st Ave. NE., Seattle, Wash. 98125

[21] Appl. No.: 889,656

[22] Filed: Mar. 24, 1978

[51] Int. Cl.$^3$ .............................................. F16C 33/72
[52] U.S. Cl. .................................. 308/36.1; 308/238; 308/240
[58] Field of Search .............................. 308/36.1–36.5, 308/240, 238, 121–122, 237 A, 126, 132, 187.1, 187.2; 277/215, 214, 213, 135, 17–19, 14 R, 14 V

[56] References Cited

U.S. PATENT DOCUMENTS

| 2,884,285 | 4/1959 | King, Jr. .......................... 308/187.2 |
| 3,183,009 | 5/1965 | Kunel .............................. 277/215 X |
| 3,810,636 | 5/1974 | Gorski ........................... 308/187.2 X |
| 4,134,596 | 1/1979 | Kawai et al. ..................... 277/214 X |

OTHER PUBLICATIONS

"The Science of Clocks and Watches", A. L. Rawlings, Second Edition, Pitman Publishing Company.

Primary Examiner—Douglas C. Butler

Attorney, Agent, or Firm—Cole, Jensen & Puntigam

[57] ABSTRACT

The bearing is configured to retain oil by capillary action. In one embodiment, a lubricant recess is provided at each end of the bearing, which recess may be completely open to the atmosphere, provided that there is an abrupt edge joining the recess to the end of the bearing, and further provided that the recess is large enough (1) to accommodate the lubricant in the bearing and (2) to permit skewing of the bearing shaft without resulting contact between the bearing shaft and the wall of the recess. An additional recess, referred to as a pressure distribution groove, may also be provided in the bearing inward of the end recess. Alternatively, a reservoir groove capable of accommodating the bearing lubricant may be provided at each end of a bearing having no open recess, which reservoir groove is separated from the bearing end by a narrow baffle. A pressure distribution groove may also be provided in combination with the reservoir groove. In a final embodiment, for high performance applications, the bearing includes an open end recess, an adjacent reservoir groove and a pressure distribution groove.

28 Claims, 8 Drawing Figures

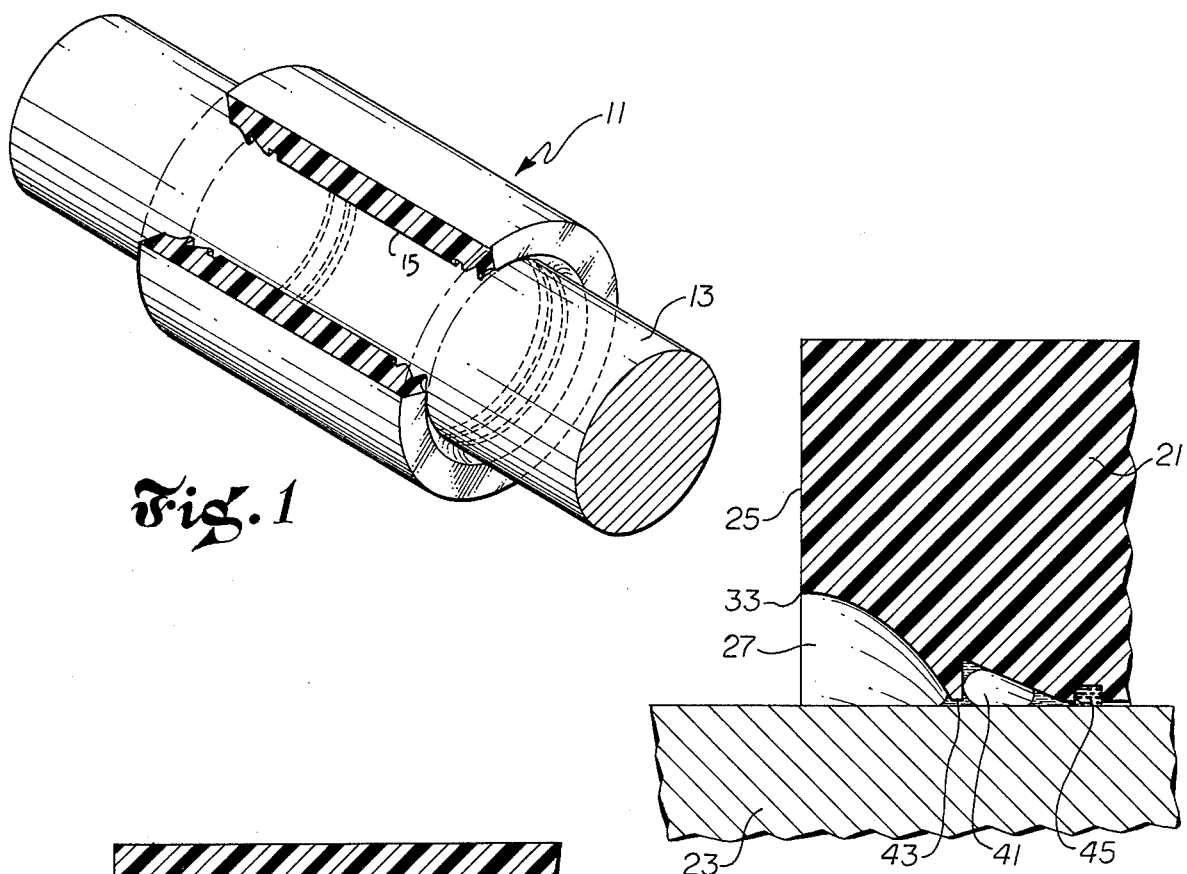
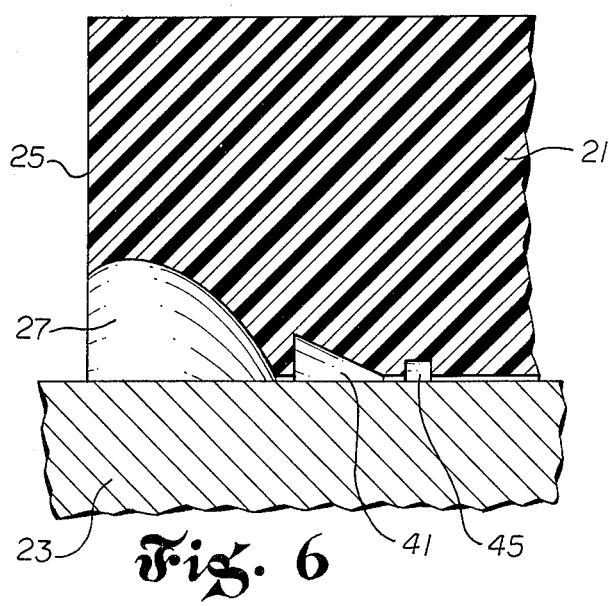

PERMANENTLY LUBRICATED BEARING

BACKGROUND OF THE INVENTION

The present invention relates generally to the bearing art, and more particularly concerns dripless bearings, especially dripless journal bearings.

In general, bearings can be divided into two basic categories, rolling element bearings and sliding contact bearings. Among the rolling element bearings, for example, are ball and/or roller bearings, which typically have very little friction but tend to fatigue under substantial loads. Rolling element bearings are also usually quite expensive and hence are generally not preferred for that reason as well.

Sliding contact bearings are further classifiable into two basic groups, the first being those which operate either hydrodynamically or by a squeeze film, and those which do not, such as powdered metal bearings and bushings.

An example of the hydrodynamic class of bearings, into which the present invention can be classified, is the traditional journal bearings, such as those used in internal combustion engines. In the journal bearing, the shaft and the bearing are separated by a film of lubricant, so that the bearing does not come into contact with the shaft, except perhaps when the two are at rest.

The hydrodynamic journal bearing has many desirable characteristics, among them being a very long life, and the capability of withstanding high loads, without high expense. For instance, hydrodynamic bearings can typically carry approximately 20 times the load that boundary lubricated bearings can carry.

Such superior operating characteristics would ordinarily make such bearings the first choice in a wide variety of bearing applications. However, the number of applications for hydrodynamic journal bearings has been heretofore severely limited, because a significant amount of bearing lubricant escapes from the bearing during normal operation. Hence, the exterior surface of the bearing, as well as any immediate surrounding surfaces, tend to become coated with the lubricant. In addition, such leakage mandates a lubricant reservoir, for replacement of the lost lubricant, adding expense to the bearing installation, and increasing the bearing's space requirement.

Accordingly, a general object of the present invention is to overcome one or more of the disadvantages of the prior art noted above.

It is a further object of the present invention to provide a bearing which does not drip lubricant.

It is another object of the present invention to provide such a bearing which is capable of breathing without discharging lubricant.

It is an additional object of the present invention to provide such a bearing which is capable of drawing externally applied lubricant into the bearing while inhibiting lubricant flow in the opposite direction.

It is a still further object of the present invention to provide such a bearing which is capable of retrieving, by capillary action, lubricant which has been squeezed out the ends of the bearings.

SUMMARY OF THE INVENTION

Accordingly, the invention is a dripless bearing, which includes a bearing surface, in or on which bearing means a shaft or the like moves relative thereto, wherein frictional contact between the bearing surface and the shaft is minimized by bearing lubricant. In one embodiment, the bearing means has recesses in the bearing surface which open onto each end of the bearing means, wherein the configuration of each recess is such that its spacial volume is larger than the volume of bearing lubricant in the bearing means, and such that the shaft cannot be skewed to contact the boundary wall of the recess. In another embodiment, the bearing means has reservoir grooves in the bearing surface, positioned to leave a relatively narrow secondary bearing surface between each reservoir groove and the neighboring end of the bearing means. Each reservoir groove has a volume at least equal to the volume of the bearing lubricant in the bearing means. Further, the spacial volume between each of the secondary bearing surfaces and the shaft is less than one-half a microliter, which is less than the volume necessary to form a traveling drop of lubricant.

DESCRIPTION OF THE DRAWINGS

A more thorough understanding of the invention may be obtained by a study of the following detailed description taken in conjunction with the accompanying drawings in which:

FIG. 1 is an isometric view of a complex embodiment of the bearing of the present invention shown with a bearing shaft.

FIG. 6 is a cross-section view of one end of a bearing with an open end recess which curves back toward the shaft.

FIG. 7 is an enlarged view of one portion of FIG. 1, shown with a bearing shaft.

FIG. 8 is an end elevation view of the bearing of FIG. 7.

DESCRIPTION OF PREFERRED EMBODIMENT

FIG. 1 shows a complex embodiment of the dripless journal bearing 11 of the present invention, through which a shaft 13 is positioned. In operation, shaft 13 does not contact the inner wall 15 of bearing 11, but rather is separated from inner wall 15 by a film of lubricant, such as oil. The film of lubricant may be produced and maintained in several ways, including: (1) hydrodynamically, by virtue of the rotation of shaft 13 in bearing 11, and (2) through a squeeze film, by virtue of a rapid reversal of the load on shaft 13. This complex embodiment, shown also in FIG. 7, will be explained in more detail hereinafter.

Figure 2:
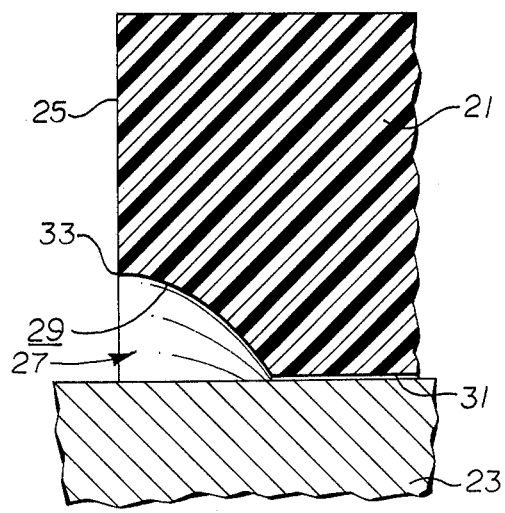
FIG. 2 is an enlarged cross-section view of one end of a bearing with an open end recess.

FIG. 2 shows the simplest embodiment of the present invention. An end portion of a bearing 21 is shown on a shaft 23. At the end 25 of the bearing is a recess shown generally at 27, which is defined by a boundary surface 29, which extends upward and outward from inner wall 31 of the bearing to end 25 thereof, terminating in an abrupt edge 33 at the end surface of the bearing.

The cross-sectional outline of recess 27 in the embodiment shown is a curve of decreasing radius from end 25 to inner wall 31, although the outline could also take other configurations, including possibly a straight line, as long as it terminates in an abrupt or sharp edge. The recess may also be curved backwards a small distance toward the shaft as shown in FIG. 6. The decreasing radius configuration, however, may be preferred since the lubricant which finds its way to the recess will be drawn to the minimal radius portion near inner wall 31, and thus will be more readily available to be drawn back into the bearing. The abrupt edge inhibits the passing of lubricant over and out of recess 27, as the lubricant attempts to maintain the same curvature throughout the bearing, which, in the embodiment shown, would be concave. An abrupt edge is a convex curve, and hence, lubricant is inhibited from passing over edge 33.

The surface of the recess 27 may be knurled, scribed or otherwise roughed, in a radial direction, to provide a surface capillary path for lubricant to pass between the recess and the remainder of the bearing. This feature has been found to be advantageous in certain applications, where capillary action alone is not sufficient to control the lubricant in the recess. Also, the roughening feature appears to work particularly well with the recess embodiment of FIG. 6. A refinement of the roughening feature in some applications is to polish the last part of the boundary wall of the recess, adjacent end 25. For the bearing of FIG. 2, over a certain range of shaft sizes and velocity, any lubricant squeezed out of the bearing into recess 27 will either be retained in recess 27 or retrieved back into the bearing by capillary action. Such an arrangement permits the use of abutting support structures for the bearing, without the danger of bearing lubricant contacting the support structure.

In normal clock bearings, which are a type of journal bearing, lubricant is held in the bearing by capillary action without a recess like 27 or other structure. However, once the bearings get above a certain size and/or angular velocity, dripping in such bearings will occur, especially in squeeze film embodiments.

The bearing configuration of FIG. 2 is designed to prevent leaking in journal bearings having a shaft sizes, and/or angular velocities above that suitable for a standard clock type bearing. The recess of FIG. 2 is superficially similar to a conventional tapered bearing, which is well known, but is differentiated from a tapered bearing by several specific structural features. First, the recess in applicant's bearing must be sufficiently large to contain the lubricant in the bearing, and is hence considerably larger than the recess in tapered bearings. Second, the recess in applicant's bearing must terminate in an abrupt edge, and third, the recess must be so configured that shaft 23 can not possibly skew to mate with the surface boundary of the recess. None of these structural features are present in a conventional tapered bearing. Hence, the recess 27 alone, as shown and described herein, is a novel feature of applicant's dripless bearing.

Figure 3:
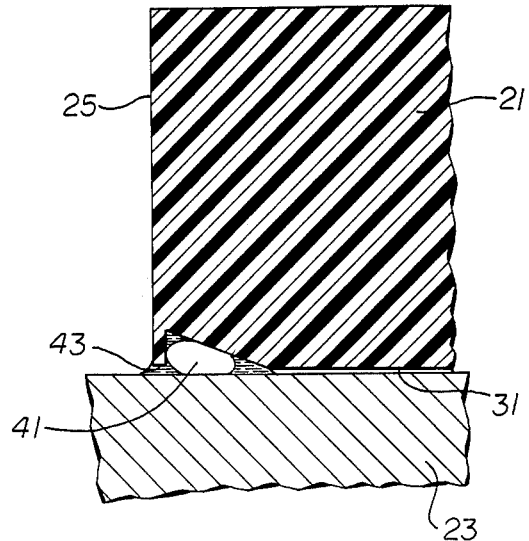
FIG. 3 is an enlarged cross-section view of one end of a bearing with a reservoir groove and a baffle.

As the size of the shaft and/or the speed of rotation of the bearing increase, additional features are necessary to maintain the bearing dripless by means of capillary action. FIG. 3 illustrates the use of a reservoir groove 41 in combination with a baffle 43. The reservoir groove 41 has a spacial volume which is at least equal to the amount of lubricant in the bearing. The baffle 41 extends down nearly to shaft 23 and forms a secondary nonload-carrying bearing surface, which is relieved approximately 5/10,000's inch, in order to avoid damage. The width of the secondary bearing surface, when multiplied by the spacial clearance between the secondary bearing surface and the shaft, must be no greater than the volume of lubricant sufficient to form a drip capable of traveling down a perpendicular surface, which is about one-half a microliter.

The reservoir groove and baffle are located at each end of the bearing and extend completely around inner wall 31 of the bearing, thereby describing a circle. In the embodiment shown, reservoir groove 41 has a cross-sectional outline of a right angle triangle, with the vertical side of groove 41 being nearest bearing end 25. The configuration of the reservoir groove is not critical, as it may be curved, though it should taper monotonically toward inner wall 31. The configuration shown has been found to provide good results in preventing lubricant from escaping from the bearing, which is one of the objects of the present invention.

Reservoir groove 41, for a bearing 1½ inches long, with external and internal diameters of 1.25 inches and 1.0 inches, respectively, will have a base dimension, along inner wall 31, of approximately three times its height. Further, the base dimension will be typically about 10% of the length of the bearing, but usually no greater than 20%.

The primary function of groove 41 is to act as a reservoir for the lubricant as it migrates between inner wall 31 of the bearing and the shaft during operation. Hence, when lubricant would normally be forced out the ends of a conventional journal bearing, the reservoir groove of the present invention provides an available space into which the lubricant can migrate within the bearing structure itself, thereby preventing the loss of lubricant from the bearing. In accordance with known principles of fluid migration, the lubricant in the bearing as it migrates in and out of groove 41, will tend to settle in the corners of the groove, as shown in FIG. 3.

The baffle 43, as stated above, acts as a nonload-carrying secondary bearing surface. In order to prevent leakage, the spatial volume between the secondary bearing surface and the shaft must be less than one-half a microliter, which is the critical volume necessary for the formation of a traveling drop.

When the spatial volume between the secondary bearing surface is less than one-half a microliter, there will at all times be insufficient lubricant between the secondary bearing surface and the shaft to produce a traveling drop even if the lubricant is pushed out of the bearing by violent sideways shaft excursions. In that case, any lubricant which may be squeezed from the bearing will not form a traveling drop, and the lubricant will be retrieved back into the bearing by capillary action, when whatever trauma pushed it out passes.

In a one-half inch bearing, the secondary bearing surface is typically on the order of 0.02 inches. If the bearing surface is greater in width, a drop capable of traveling will usually result. Generally, surface 43 should be as narrow as practical to machine and construct, and should have some additional clearance from the shaft, such as 5/10,000's inch, as noted above.

The combination of reservoir groove 41 and baffle 43 will result, in many applications, in a dripless journal bearing. All of the lubricant will be retained in the bearing, because reservoir groove 41 provides a space into which the lubricant can travel. Baffle 43 provides a secondary nonload-carrying bearing surface which aids in retaining lubricant within the bearing.

In the embodiment of FIG. 3, reservoir groove 41, in operation, will begin to fill with lubricant, in the corners, tending toward a circular opening. When the lubricant reaches this condition, which is unstable, the opening closes at some point around groove 41, resulting in a bubble, typically, at the top of the bearing. The ends of this bubble or region now have a smaller surface curvature than previously, and since the surface curvature of all the lubricant in the bearing seeks the same curvature, lubricant is drawn from elsewhere where the curvature is greater. This includes the lubricant film which is outside the bearing, which is drawn back into the bearing. This movement of the lubricant continues until all the lubricant in the bearing has achieved the smaller radius of curvature.

Figure 4:
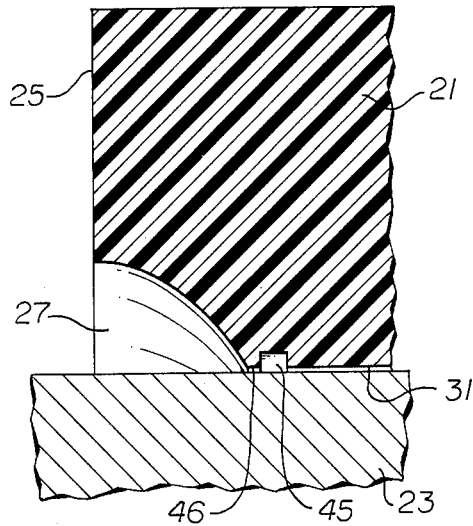
FIG. 4 is an enlarged cross-section view of one end of the bearing of FIG. 2 with a pressure distribution groove.
Figure 5:
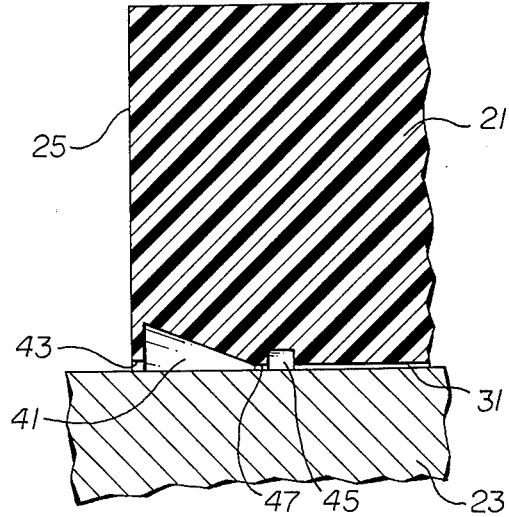
FIG. 5 is an enlarged cross-section view of the bearing of FIG. 3 with a pressure distribution groove.

As the size and/or angular rotation of the bearing increases further, additional features are necessary to insure dripless action. FIGS. 4 and 5 show a pressure distribution groove 45 in conjunction with either the recess of FIG. 2 or the reservoir groove of FIG. 3.

Pressure distribution grooves 45 are desirable because high pressure regions develop where the shaft 23 is forced into the bearing 21. As the shaft rotates in operation, lubricant, such as oil, is pumped from the boundaries of the high pressure region into the reservoir grooves, which may overfill at the point of high pressure, if this movement of lubricant were not corrected. The purpose of the pressure distribution grooves is to provide a space to conduct this lubricant to low pressure portions of the bearing surface. In FIG. 5, pressure distribution groove 45 is machined or cast in the inner wall 31 of the bearing 21 slightly upstream of the reservoir groove 41 such that there is a small bearing surface 47 between the pair of grooves. In FIG. 4, the bearing surface between the recess 27 and the pressure distribution groove 45 is denoted by the numeral 46. Bearing surfaces 46 and 47 inhibit the lubricant from entering reservoir groove 41 or recess 27. The pressure distribution groove 45 is significantly smaller in volume than either the recess 27 or the reservoir groove 41, and should be no greater than 20% of the height of either recess 27 or reservoir groove 41. Otherwise, it is more difficult to draw oil from the recess or reservoir groove by capillary action back into the bearing.

Generally, it has been found that pressure distribution grooves having a spatial volume of approximately five percent of the bearing clearance volume have provided satisfactory results. The configuration of the pressure distribution grooves 45, in the embodiments shown, is generally squarish. However, such a configuration, while providing beneficial results, is not critical.

FIG. 7 illustrates the most complex embodiment of the present invention, combining a reservoir groove 41 and baffle 43, a pressure distribution groove 45, and a recess 27. This embodiment combines all of the advantages of the individual structural features explained in detail above in one embodiment. Hence, a bearing having the configuration as that shown in FIG. 7 will be able to tolerate the highest angular velocities, the largest shafts, and the greatest loads of all the embodiments shown, without dripping.

In the embodiment of FIG. 7, all points on the recess 27 will have a curvature considerably larger, i.e. 5–10 times, than the curvature of the largest circle which can be drawn in reservoir groove 41. Generally, the recess 27 will be 2 to 3 times the depth of the reservoir groove, and as in the embodiment of FIG. 2, edge 31 is abrupt.

Referring now to FIG. 8, the present invention also provides specific means for permitting the bearing to breathe. It has been determined by the applicant that the volume of gas contained in a bearing, i.e. the volume of air trapped between the inner wall and the shaft, will vary during operation of the bearing. This variance is caused by (1) changes in bearing temperature, which result in the expansion and contraction of the trapped gas, and (2) changes in bearing pressure on the bubbles of trapped gas, due to load changes, which results in changes in volume of trapped gas.

When the gas in the bearing expands, a portion of the lubricant between the bearing surface 43 and the shaft might otherwise be forced out of the bearing, resulting in a drip, unless such expansion of the gas in the bearing can be relieved. In the bearing shown, small slots or nicks are made in the baffle edges, which communicate the reservoir grooves with the atmosphere. Several such small slots 50—50 are shown in FIG. 8.

In the embodiment shown, they take the form of small triangles, having a base line about $\frac{1}{3}$ as wide as the depth of the reservoir groove 41. The slots 50—50 have a height which is approximately one-third the depth of the reservoir groove, and are located at 120° intervals around the periphery of the opening at each end of the bearing.

As the gas in the bearing expands, the lubricant in the slots 50—50 will be blown out, thereby relieving the pressure created by the expanding gas. Since the volume of the lubricant in the slots 40—40 is much less than one-half a microliter, which is the minimum drop volume, no lubricant drip results. Hence, any pressure caused by the expansion of gas in the bearing is relieved by means of the slots, without affecting the dripless characteristic of the bearing. Although the number and configuration of the slots may vary, it has been found that a minimum of three triangular slots, spaced equally at 120° intervals, provide adequate results.

The present invention has been described in the context of a journal bearing, and the recesses, reservoir grooves and pressure distribution grooves shown have been adapted for that configuration. However, it should be understood that the same structural concepts can be readily adapted for other bearing configurations, such as thrust bearings and chain roller. In a thrust bearing, on which a shaft moves relative thereto, the recess is adjacent the continuous outer boundary, referred to as the end boundary, of the bearing, with the reservoir and pressure distribution grooves, respectively, being concentric to the recess but spaced radially inward therefrom.

Hence, a bearing has been disclosed which combines several structural features in order to utilize capillary action to prevent the formation of sufficient lubricant at the ends of the bearing to form a traveling drop. Although a preferred embodiment of the present invention has been disclosed herein for purposes of illustration, it should be understood that various changes, modifications and substitutions may be incorporated in such an embodiment without departing from the spirit of the invention, which is defined by the claims which follow.

What is claimed is:

1. A dripless bearing, comprising:
load-carrying, substantially rigid bearing means having a bearing surface, in or on which bearing means a shaft moves relative thereto, wherein frictional contact between the bearing surface and the shaft is minimized by bearing lubricant, said bearing means having at least one recess in the bearing surface which opens onto an end boundary of said bearing means, wherein the spacial volume of said recess is larger than the volume of bearing lubricant in said bearing means between the bearing surface and the shaft, said recess having such a configuration that the bearing lubricant tends to remain in the bearing means during operation, wherein the recess is defined by a boundary wall which is radially roughened to assist in retrieval of bearing lubricant back into the bearing, and which terminates in an abrupt edge at the end boundary.

2. A bearing of claim 1, wherein the recess boundary wall is curved in a decreasing radius inward of the bearing from the end boundary thereof.

3. A bearing of claim 2 wherein the recess boundary wall curves back a small distance toward the shaft before terminating at the end boundary of said bearing means.

4. A bearing of claim 1, wherein said recess extends inwardly from the adjacent end boundary of the bearing a distance which is approximately three times the maximum height of said recess.

5. A bearing of claim 4, including a reservoir groove in the bearing surface positioned to leave a first secondary bearing surface between said reservoir groove and said recess, wherein said reservoir groove has a volume at least equal to the volume of the bearing lubricant, and wherein the spacial volume between said first secondary bearing surface and the shaft is less than one-half of a microliter, which is less than the volume necessary to form a traveling drop of lubricant.

6. A bearing of claim 5, wherein said recess is approximately at least three times as deep as said reservoir groove.

7. A bearing of claim 5, including a pressure distribution groove in the bearing surface, positioned to leave a relatively narrow second secondary bearing surface between said pressure distribution groove and the adjacent reservoir groove, wherein the depth of said pressure distribution groove is substantially less than the depth of said reservoir groove, said pressure distribution groove serving to distribute bearing lubricant in said reservoir groove, thereby preventing overfilling of the pressure distribution groove at one point under heavy load.

8. A bearing of claim 7, wherein the spacial volume of said pressure distribution groove is approximately ten % of the clearance volume between the bearing surface and the shaft.

9. A bearing of claim 5, including means communicating said reservoir groove with the atmosphere.

10. A bearing of claim 9, wherein said communicating means comprises a plurality of openings located at spaced intervals in the end boundaries of said bearing means, wherein the total spacial volume of said openings in each end boundary is less than necessary to form one traveling drop of lubricant.

11. A bearing of claim 4, including a pressure distribution groove in the bearing surface, positioned to leave a relatively narrow second secondary bearing surface between said pressure distribution groove and its adjacent recess, wherein the depth of said pressure distribution groove is substantially less than the depth of said recess, said pressure distribution groove serving to distribute bearing lubricant into said recess, thereby preventing overfilling of the pressure distribution groove at one point under bearing load.

12. A bearing of claim 11, wherein the spacial volume of said pressure distribution groove is approximately 10% of the clearance volume between the bearing surface and the shaft.

13. A dripless bearing comprising:
load-carrying, substantially rigid bearing means having a bearing surface, in or on which bearing means a shaft moves relative thereto, wherein frictional contact between the bearing surface and the shaft is minimized by bearing lubricant, said bearing means having at least one reservoir groove in the bearing surface positioned to leave a relatively narrow first secondary surface between said reservoir groove and the neighboring end boundary of said bearing means, wherein said reservoir groove has a volume at least equal to the volume of the bearing lubricant in said bearing means between said bearing surface and said shaft, and wherein the spacial volume between each of said first secondary bearing surfaces and the shaft is less than one-half of a microliter, which is less than the volume necessary to form a traveling drop of lubricant.

14. A bearing of claim 13, including a pressure distribution groove in the bearing surface, positioned to leave a relatively narrow second secondary bearing surface between said pressure distribution groove and its adjacent reservoir groove, wherein the depth of said pressure distribution groove is substantially less than the depth of said reservoir groove.

15. A bearing of claim 14, wherein the spacial volume of said pressure distribution groove is approximately ten % of the clearance volume between the bearing surface and the shaft.

16. A bearing of claim 15, including means communicating said reservoir groove with the atmosphere, wherein said communicating means comprises a plurality of openings located at spaced intervals in the end boundaries of said bearing means, wherein the total spacial volume of said openings in each end boundary is less than is necessary to form one drop of traveling lubricant.

17. A dripless bearing, comprising:
load-carrying, substantially rigid bearing means having a bearing surface, in or on which bearing means a shaft moves relative thereto, wherein frictional contact between the bearing surface and the shaft is minimized by bearing lubricant, said bearing means having (1) at least one recess in the bearing surface which opens onto an end boundary of said bearing means, and (2) a reservoir groove in the bearing surface positioned to leave a first secondary bearing surface between said reservoir groove and said recess, wherein the spacial volume of said recess is larger than the volume of bearing lubricant in said bearing means between the bearing surface and the shaft, said recess having such a configuration that the bearing lubricant tends to remain in the bearing means during operation, and wherein said reservoir groove has a volume at least equal to the volume of the bearing lubricant, the spacial volume between said first secondary bearing surface and the shaft being less than one-half of a microliter, which is less than the volume necessary to form a traveling drop of lubricant.

18. A bearing of claim 17, wherein said recess is approximately at least three times as deep as said reservoir groove.

19. A bearing of claim 17, including a pressure distribution groove in the bearing surface, positioned to leave a relatively narrow second secondary bearing surface between said pressure distribution groove and the adjacent reservoir groove, wherein the depth of said pressure distribution groove is substantially less than the depth of said reservoir groove, said pressure distribution groove serving to distribute bearing lubricant in said reservoir groove, thereby preventing overfilling of the pressure distribution grooves at one point under heavy load.

20. A bearing of claim 19, wherein the spacial volume of said pressure distribution groove is approximately 10% of the clearance volume between the bearing surface and the shaft.

21. A bearing of claim 17, including means communicating said reservoir groove with the atmosphere.

22. A bearing of claim 21, wherein said communicating means includes a plurality of openings located at spaced intervals in the end boundaries of said bearing means, wherein the total spacial volume of said openings in each end boundary is less than the volume necessary to form one traveling drop of lubricant.

23. A dripless bearing, comprising:
load-carrying, substantially rigid bearing means having a bearing surface, in or on which bearing means a shaft moves relative thereto, wherein frictional contact between the bearing surface and the shaft is minimized by bearing lubricant, said bearing means having at least one recess in the bearing surface which opens onto the end boundary of said bearing means, wherein the spacial volume of said recess is larger than the volume of bearing lubricant in said bearing means between the bearing surface and the shaft, and wherein said recess is defined by a boundary wall which approaches the shaft at an angle which is substantially less than 90°, said recess having such a configuration that the bearing lubricant tends to remain in the bearing means during operation.

24. A bearing of claim 23, wherein the recess boundary wall terminates in an abrupt edge at the bearing end boundary.

25. A bearing of claim 24, wherein the recess boundary wall is radially roughened to assist in retrieval of bearing lubricant back into the bearing.

26. A bearing of claim 24, wherein the recess boundary wall is curved in a decreasing radius inward of the bearing from the end boundary thereof.

27. A bearing of claim 26, wherein the recess boundary wall curves back a small distance toward the shaft before terminating at the end boundary of said bearing means.

28. A bearing of claim 24, wherein said recess extends inwardly from the adjacent end boundary of the bearing a distance which is approximately three times the maximum height of said recess.

* * * * *